United States Patent [19]
Narkon

[11] Patent Number: 5,398,294
[45] Date of Patent: Mar. 14, 1995

[54] TRACK ROLLER BEARING

[75] Inventor: Glenwood H. Narkon, Rockville, Conn.

[73] Assignee: Kamatics Corporation, Bloomfield, Conn.

[21] Appl. No.: 165,256

[22] Filed: Dec. 10, 1993

[51] Int. Cl.⁶ .............................................. F16C 33/02
[52] U.S. Cl. .................................... 384/280; 384/295
[58] Field of Search ............... 384/58, 110, 275, 276, 384/280, 282, 295, 296, 297, 298, 299, 300, 416, 417, 418

[56] References Cited

U.S. PATENT DOCUMENTS

| | | |
|---|---|---|
| 1,422,655 | 7/1922 | Brehmer . |
| 1,444,259 | 2/1923 | Lothrop . |
| 1,887,168 | 11/1932 | Rauberstrauch . |
| 1,983,796 | 12/1934 | Geyer . |
| 2,130,461 | 9/1938 | Gilman . |
| 2,366,668 | 1/1945 | Heim . |
| 2,665,956 | 1/1954 | Heim . |
| 2,759,244 | 8/1956 | Heim . |
| 3,063,133 | 11/1962 | Straus et al. . |
| 3,162,930 | 12/1964 | Litsky . |
| 3,193,910 | 7/1965 | Evans . |
| 3,266,123 | 8/1966 | McCloskey . |
| 3,528,710 | 9/1970 | Roesner et al. . |
| 3,626,566 | 12/1971 | Kilgour . |
| 3,984,152 | 10/1976 | Haines ................... 384/280 |
| 4,079,490 | 3/1978 | McCloskey . |
| 4,134,842 | 1/1979 | Orkin et al. . |
| 4,219,916 | 9/1980 | Kincel . |
| 4,277,118 | 7/1981 | McCloskey . |
| 4,477,197 | 10/1984 | Choate ................... 384/296 |
| 4,571,811 | 2/1986 | Pruvost . |
| 4,685,184 | 8/1987 | Satkamp . |
| 4,717,268 | 1/1988 | Orkin ..................... 384/280 |
| 4,842,424 | 1/1989 | Narkon et al. . |
| 5,114,521 | 5/1992 | Isegawa et al. . |
| 5,137,374 | 8/1992 | Orkin ..................... 384/298 |
| 5,219,232 | 6/1993 | Adams .................... 384/275 |

Primary Examiner—Thomas R. Hannon
Attorney, Agent, or Firm—Fishman, Dionne & Cantor

[57] ABSTRACT

A track roller bearing and method of manufacture thereof is presented in which the axial thrust bearing elements are integral inclined opposed surfaces formed on the inner and outer races of the track roller bearing. The inner race is swaged to form the inclined axial bearing surfaces on the inner race after the races are assembled. A self-lubricating material is bonded to the inner race, including the axial bearing inclined surfaces thereof, after the inner and outer races are assembled and the axial bearing surfaces are formed.

12 Claims, 1 Drawing Sheet

TRACK ROLLER BEARING

BACKGROUND OF THE INVENTION

This invention relates to the field of track roller bearings, and particularly to the field of track roller bearings having a self-lubricating material on one of the races of the track roller bearing. More particularly, this invention involves an improvement in the construction of axial thrust bearings of a track roller bearing.

Track roller bearings, and particularly track roller bearings having a self-lubricating liner or bearing material, are well known in the art. When originally introduced, and for many years thereafter, self-lubricated track roller bearings had the self-lubricating liner material bonded to the inner surface of the outer race. Examples of such self-lubricated track roller bearings are disclosed in U.S. Pat. Nos. 4,048,370 and 4,134,842, the disclosures of which are incorporated herein by reference.

A very important improvement in the construction of self-lubricated track roller bearings is disclosed in U.S. Pat. No. 4,717,268, wherein the self-lubricating liner or bearing material is secured to the outer surface of the inner race. The construction of U.S. Pat. No. 4,717,268 resulted in a track roller bearing having the advantage of significantly extended bearing life relative to track roller bearings in which the self-lubricating material was secured to the inner surface of the outer race. U.S. Pat. No. 4,717,268 is assigned to the assignee hereof, and the disclosure thereof is incorporated herein by reference.

All of the self-lubricating bearings discussed above have side rings perpendicular to the axis of the bearing and perpendicular to the primary load bearing faces of the inner and outer races. These side rings are connected to the inner races, and the side rings serve both to lock the inner and outer races together and to absorb axial thrust loads in the bearing, i.e., loads in the direction of the axis of the bearing and perpendicular to the direction of the load normally imposed on the inner and outer races of the bearing. These side rings face and oppose flat areas on opposite sides of the outer race which are perpendicular to both the axis of the bearing and to the bearing face of the outer race. As disclosed in, e.g., U.S. Pat. Nos. 4,134,842 and 4,717,268, while one of the side or thrust rings may be integral with the inner race, the other ring is a separate element which is attached, e.g., by welding or press fit, to the inner race after the inner and outer races are assembled. Thus, self-lubricated track roller bearings of the prior art require at least three separate elements (four if the self-lubricating bearing liner is counted as a separate element); and at least one of the side rings must be welded or otherwise secured to the inner race after the bearing is assembled. This is undesirable because the requirement for separate ring parts and the processing to attach the rings results in increased costs for the bearing. Also, if self-lubricating material is to be used for the axial thrust elements, it is applied in separate rings to the flat surfaces on the outer race opposing the side rings (see, e.g., U.S. Pat. No. 4,717,268). This, too, adds to the cost of the bearing.

An example of a self-aligning track roller bearing having self-lubricating material on the outer diameter of the inner race is shown in U.S. Patent 4,842,424, the entirety of which is also incorporated herein by reference.

SUMMARY OF THE INVENTION

In accordance with the improved track roller bearing of the present invention, the outer race of the bearing is machined with inwardly inclined side surfaces from the outer cylindrical surface to the inner cylindrical surface. The inner race is formed with complimentary outwardly inclined side surfaces extending from the inner cylindrical surface to match and oppose the inclined side surfaces on the outer race. The inclined side surfaces on the inner race are formed by swaging the sides of the inner race after the inner and outer races are assembled together.

In accordance with the present invention, a self-lubricating material is injected into the space between the inner and outer races, and this material is then cured to form a self-lubricating liner bonded to the cylindrical load surface of one of the races and to the side inclined surface of that race. Preferably, the self-lubricating liner is bonded to the inner race and its associated inclined surfaces.

The inclined side surfaces of the inner and outer races serve both to retain the inner and outer races against separation and as bearing surfaces to absorb axial thrust loads. The construction of this invention is an improvement over the prior art in that it reduces the number of parts to two (three if the self-lubricating liner is counted as a separate element), thus reducing the cost of the bearing. Also, the liner is applied to the primary load bearing surface of the inner race and to the inclined surfaces of the inner race as a single continuous layer of self-lubricating material, thus eliminating the need for applying self-lubricating material to separate parts of the inner and outer races.

The foregoing and other features and advantages of this invention will be apparent to and understood by those skilled in the art from the following detailed description and drawings.

BRIEF DESCRIPTION OF THE DRAWINGS

Referring now to the drawings, wherein like elements of FIGS. 1 and 2 are numbered alike and like elements of FIGS. 3–6 are numbered alike.

DESCRIPTION OF THE PREFERRED EMBODIMENT

Figure 1:
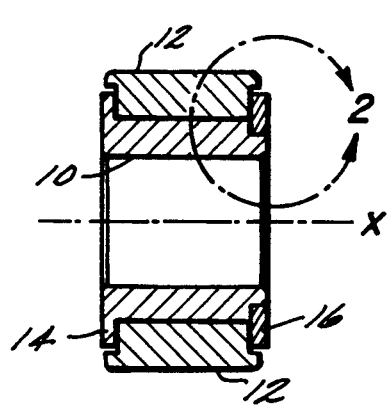
FIG. 1 is a sectional elevation view of a prior art track roller bearing.
Figure 2:
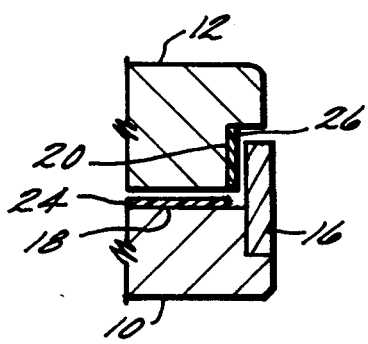
FIG. 2 is an enlarged detail of the part of FIG. 1 indicated by the circle 2.

The prior art of U.S. Pat. No. 4,717,268 is shown in FIGS. 1 and 2. In accordance with that prior art, the track roller bearing has an inner cylindrical race 10 and an outer cylindrical race 12, both of which are concentric about an axis X. Inner race 10 has side ring surfaces 14 and 16, one of which (14) may be integral with inner race 10, and the other of which (16) is secured, as by welding or otherwise, to inner race 10 after the inner and outer races are assembled to form the track roller bearing. The side surfaces 14 and 16 are aligned perpendicular to axis X and the outer cylindrical surface 18 of inner race 10, and these side surfaces face opposed side walls 22 on the outer race, which side walls 22 are also perpendicular to axis X. A self-lubricating material 24 is secured to outer cylindrical surface 18 of inner race 10, and rings 26 of the self-lubricating material are also secured to the side walls 20 of outer race 12.

Figure 3:
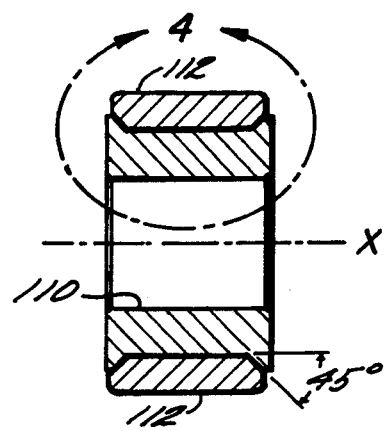
FIG. 3 is a sectional elevation view of the track roller bearing of this invention.
Figure 4:
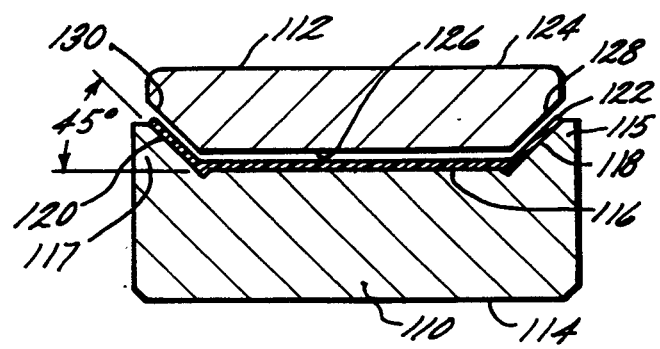
FIG. 4 is an enlarged detail of the part of FIG. 3 indicated by the circle 4, with the spacing between the inner and outer races of the bearing being slightly exaggerated to facilitate description.

Referring now to FIGS. 3 and 4, the track roller bearing of the present invention is shown, the bearing having an inner cylindrical race 110 and an outer cylindrical race 112, both of which are concentric about axis X. Inner race 110 has an inner cylindrical surface (I.D.) 114 and an outer cylindrical surface (O.D.) 116. Outer cylindrical surface 116 of inner race 110 extends across the major part of the width of inner race 110 and is flanked at the ends by triangular elements 115 and 117 with inclined surfaces 118 and 120, respectively. The triangular elements 115 and 117 are integral parts of inner race 110, and the inclined surfaces 118 and 120 extend outwardly at an angle of about 45° with respect to the O.D. surface 116 of inner race 110. A self-lubricating material 122 is secured to the O.D. surface 116 of inner race 110 and to the inclined surfaces 118 and 120 of inner race 110.

Outer race 112 has an outer cylindrical surface (O.D.) 124 and an inner cylindrical surface (I.D.) 126. Inner cylindrical surface 126 of outer race 112 extends across the major part of the width of outer race 112 and is flanked at the ends by inclined surfaces 128 and 130 which slope inwardly (i.e., incline from O.D. 124 toward I.D. 126) at angles complementary to the slope of inclined surfaces 118 and 120). Thus, when the included angle between each of surfaces 116 and 118 and 116 and 120 is about 135°, the included angle between each of surfaces 126 and 128 and 126 and 130 is about 225°.

The opposed cylindrical surfaces 116 (O.D. on inner race 110) and 126 (I.D. on outer race 112), along with the self-lubricating material 122 therebetween, constitute the radial load transmission and bearing surfaces of the track roller bearing. The opposed inclined surfaces 118 and 128 and the opposed inclined surfaces 120 and 130 constitute axial thrust bearing elements to take axial loads, i.e., loads in the direction of axis X. It will, however, also be noted that these inclined surfaces may also carry a radial load component. It is also to be noted that the triangular elements 115 and 117 serve to contain the outer race axially within the inner race and thereby keep the track roller bearing assembled.

Figure 5:
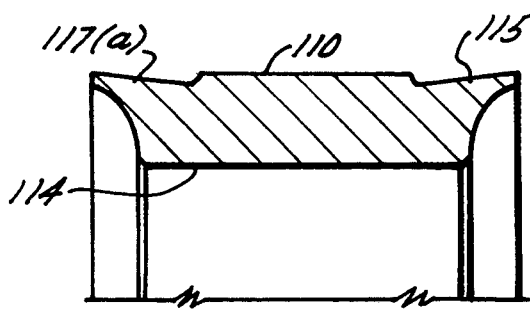
FIG. 5 is a partial sectional elevation view of the inner race of the present invention before assembly and swaging.
Figure 6:
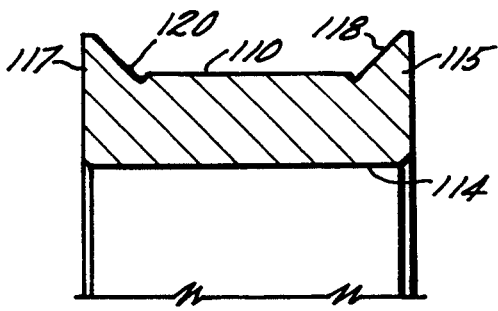
FIG. 6 is a partial sectional elevation view of the inner race of the present invention after assembly and swaging.

As noted above, the triangular elements 115 and 117 are integral with inner race 110. This is achieved by a swaging step. Referring to FIGS. 5 and 6, the inner race 110 is originally formed with axially extending side elements or wings 115(a) and 117(a) protruding from the main body of inner race 110 (see FIG. 5). The inner and outer races of the track roller bearing are then assembled with the inner race 110 inside the outer race and with the wings 115(a) and 117(a) extending axially beyond the width of the main bodies of the inner and outer races. The wings 115(a) and 117(a) are then swaged to form the wings 115 and 117 with their respective inclined surfaces 118 and 120 (see FIG. 6) and to retain the races together against axial separation.

As best seen in FIG. 4, the self-lubricating material 122 is bonded to one of the opposed faces of the races. Preferably, the self-lubricating material is bonded to the OD surface 116 of inner race 110; but it is also within the scope of this invention, although less desirable, to bond the self-lubricating material to the ID surface 126 of outer race 112. In accordance with the present invention, before the inner and outer races 110 and 112 are assembled together and the triangular elements 115 and 117 are formed, the ID surface 126 of outer race 112 (i.e., the surface to which the self-lubricating material is not to be bonded) is coated with a release agent such as Teflon; and the OD surface 116 of inner race 110 is grit blasted and acid etched (for subsequent bonding of the self-lubricating material). The inner and outer races are then assembled together and the triangular elements 115 and 117 are formed by swaging, as described above. At this point, there is a small uniform annular space (on the order of 0.020 inches) between OD surface 116 of inner race 110 and ID surface 126 of outer race 112; and that uniform space also separates inclined surfaces 118, 128 and 120, 130, respectively. The self-lubricating material is then injected in uncured form into that annular space between the inner and outer races, including the space between cylindrical bearing surfaces 116 and 126 and between inclined surfaces 118, 128 and 120, 130. The self-lubricating material is cured (by heat) to form self-lubricating layer 122 bonded to OD surface 116 and to inclined surfaces 118 and 120 of inner race 110. After the self-lubricating material has been cured, the inner and outer races are rotated relative to each other to break the release agent from ID surface 126 of outer race 112 to permit the inner and outer races to rotate relative to each other.

After assembly of the inner and outer races 110 and 112 and swaging to form triangular elements 115 and 117, but before injection of the uncured self-lubricating material, the assembled races may be put into a cylindrical fixture which surrounds and compresses outer race 112 to slightly reduce the annular space between OD surface 116 of inner race 110 and ID surface 126 of outer race 112 and between the inclined surfaces. With the races still retained in the fixture, the uncured self-lubricating material is then injected into that reduced annular space between the races and cured. The bearing is then removed from the fixture, and the outer race returns to its original size to establish a slight clearance between the cured self-lubricating material and the ID surfaces 126, 128 and 130 of outer race 112. The races are then rotated relative to each other to ensure that they are free to rotate.

In use of the track roller bearing of the present invention, the ID surface 114 of inner race 110 is typically mounted on a shaft or other part which translates but does not rotate; and OD surface 124 of outer race 112 rides on a track and rotates as it moves along and follows the track.

In accordance with the present invention, and as disclosed in U.S. Pat. No. 4,717,268, the inner and outer races 110 and 112 are typically made of stainless steel, titanium or aluminum, with inner race 110 being slightly softer than outer race 112 (as is conventional in track roller bearings); and the material for the self-lubricating layer 122 is preferably a polytetrafluoroethylene filled thermosetting polyester.

It is also to be noted that the present invention with the opposed inclined surfaces on the inner and outer races can be applied to the construction of airframe bearings where the self-lubricating liner is applied to the inner surface of the outer race.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A track roller bearing comprising:
   an inner race having an annular load bearing surface around an axis and extending in the direction of and being coaxial with the axis;
   first and second inclined surfaces extending from said inner race at opposite ends of said annular load bearing surface of said inner race, said surfaces being integral parts of said inner race and being inclined away from said axis;
   an outer race having an annular load bearing surface extending in the direction of and being coaxial with said axis, said annular load bearing surface of said outer race facing and being spaced from said annular load bearing surface of said inner race;
   first and second inclined surfaces extending from said outer race at opposite ends of said annular load bearing surface of said outer race; said first and second inclined surfaces of said outer race being opposed, respectively, to and spaced from said first and second inclined surfaces of said inner race; and
   a layer of self-lubricating material affixed to said annular load bearing surface and said first and second inclined surfaces of said inner race.

2. The track roller bearing of claim 1 wherein:
   said layer of self-lubricating material is essentially of constant thickness on said annular load bearing surface and the first and second inclined surface of said inner race.

3. The track roller bearing of claim 1 wherein:
   said first and second inclined surfaces on said inner race are each inclined at an angle of about 45° to the annular load bearing surface thereof, or at an included angle of about 135° with respect to said annular load bearing surface.

4. The track roller bearing as in claim 1, including:
   first and second end elements integral with said inner race, said first and second inclined surfaces of said inner race being on said end elements.

5. The track roller bearing as in claim 4 wherein:
   said end elements are triangular elements.

6. The track roller bearing as in claim 4 wherein said first and second end elements are formed on said inner race by swaging elements extending axially outward from said annular load bearing surface of said inner race.

7. A bearing comprising:
   an inner race having an annular load bearing surface around an axis and extending in the direction of and being coaxial with the axis;
   first and second inclined surfaces extending from said inner race at opposite ends of said annular load bearing surface of said inner race, said surfaces being integral parts of said inner race and being inclined away from said axis;
   an outer race having an annular load bearing surface extending in the direction of and being coaxial with said axis, said annular load bearing surface of said outer race facing and being spaced from said annular load bearing surface of said inner race;
   first and second inclined surfaces extending from said outer race at opposite ends of said annular load bearing surface of said outer race; said first and second inclined surfaces of said outer race being opposed, respectively, to and spaced from said first and second inclined surfaces of said inner race; and
   a layer of self-lubricating material affixed to the annular load bearing surface and the first and second inclined surfaces of one of said inner or outer races.

8. The bearing of claim 7 wherein:
   said layer of self-lubricating material is essentially of constant thickness on said annular load bearing surface and the first and second inclined surface of said one race.

9. The bearing of claim 7 wherein:
   said first and second inclined surfaces on said inner race are each inclined at an angle of about 45° to the annular load bearing surface thereof, or at an included angle of about 135° with respect to said annular load bearing surface.

10. The bearing as in claim 7, including:
    first and second end elements integral with said inner race, said first and second inclined surfaces of said inner race being on said end elements.

11. The bearing as in claim 10 wherein:
    said end elements are triangular elements.

12. The bearing as in claim 10 wherein:
    said first and second end elements are formed on said inner race by swaging elements extending axially outward from said annular load bearing surface of said inner race.

* * * * *